United States Patent
Jung et al.

(10) Patent No.: US 9,013,117 B2
(45) Date of Patent: Apr. 21, 2015

(54) METHOD FOR DRIVING COLOR LAMP AND APPARATUS THEREFOR

(75) Inventors: Dae-Kwang Jung, Gyeonggi-do (KR); Yun-Je Oh, Suwon-si (KR); Sung-Bum Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1003 days.

(21) Appl. No.: 12/706,604

(22) Filed: Feb. 16, 2010

(65) Prior Publication Data
US 2010/0207546 A1    Aug. 19, 2010

(30) Foreign Application Priority Data
Feb. 13, 2009    (KR) .......................... 10-2009-0011960

(51) Int. Cl.
*H05B 37/02*    (2006.01)
*H05B 33/08*    (2006.01)

(52) U.S. Cl.
CPC .......... *H05B 33/086* (2013.01); *H05B 33/0818* (2013.01); *Y02B 20/341* (2013.01)

(58) Field of Classification Search
USPC .................. 315/149, 150, 151, 152, 294, 297; 345/102, 207
See application file for complete search history.

(56) References Cited

U.S. PATENT DOCUMENTS

| 2004/0042234 | A1 | 3/2004 | Otake |
| 2007/0058987 | A1 | 3/2007 | Suzuki |
| 2007/0296686 | A1* | 12/2007 | Yoo ............................... 345/102 |
| 2009/0066634 | A1* | 3/2009 | Isobe et al. .................... 345/102 |
| 2009/0189530 | A1* | 7/2009 | Ashdown et al. ............. 315/152 |
| 2010/0134037 | A1 | 6/2010 | Huber et al. |
| 2010/0264834 | A1* | 10/2010 | Gaines et al. ................. 315/152 |

FOREIGN PATENT DOCUMENTS

| JP | 2004-93761 | 3/2004 |
| JP | 2007-81703 | 3/2007 |
| KR | 1020050071617 | 7/2005 |
| KR | 1020080043431 | 5/2008 |
| KR | 1020080063432 | 7/2008 |
| KR | 1020080072661 | 8/2008 |

* cited by examiner

*Primary Examiner* — Tung X Le
*Assistant Examiner* — Jonathan Cooper
(74) *Attorney, Agent, or Firm* — The Farrell Law Firm, P.C.

(57) ABSTRACT

Disclosed is a color lamp driving apparatus for generating illumination light of various colors by using a plurality of Red (R), Green (R), and Blue (B) lamps together with each other, having a color controller for generating a color control signal, which indicates driving time rates of R, G, and B lamp arrays, according to color information of required illumination light, and a lamp driving module for outputting a driving signal for driving each of R, G, and B lamp arrays according to the color control signal output from the color controller. The driving signal is set to apply driving times for the R, G, and B lamp arrays based on one among a start time point, a middle time point, and an end time point of each corresponding period ΔT within one light-emitting period T.

4 Claims, 7 Drawing Sheets

FIG.7

METHOD FOR DRIVING COLOR LAMP AND APPARATUS THEREFOR

PRIORITY

This application claims priority to an application entitled "Method for Driving Color Lamp and Apparatus Thereof" filed in the Korean Industrial Property Office on Feb. 13, 2009 and assigned Serial No. 10-2009-0011960, the contents of which are incorporated herein by reference.

BACKGROUND OF THE INVENTION

1. Field of the Invention

The present invention relates generally to a color lamp driving method, and more particularly, to a color lamp driving method which is suitable for application to Visible Light Communication (VLC) and is implemented with usual Red (R), Green (G), and Blue (B) Light Emitting Diode (LED), and an apparatus therefor.

2. Description of the Related Art

In general, VLC is a technology for data communication using visible light. Extensive research is being conducted to develop an illumination light communication system for transmitting signals by controlling the on/off status or light intensity of a lamp, such as a white LED, used for illumination.

Of particular importance is the active research being conducted on the development of the illumination light communication in association with a power line communication system. An example of such technologies is disclosed in Korea Patent Application No. 2005-7007071 to Kabushiki Kaisha Nakagawa Kenkyusho, entitled "Illumination Light Communication System" and filed on Apr. 23, 2005.

Schemes using general white LEDs have been developed for lamps used in the VLC technology, and such a white LED has advantages of requiring considerably lower power consumption, having a smaller size, and having a longer lifespan due to the characteristics of the LED, as compared with the conventional glow and fluorescent lamps.

Technology is currently being developed for generating white light by mixing and using multiple color lamps, such as R, G, and B color LEDs, instead of using only white LEDs, and generating illumination light with various colors other than white color. In addition, there is a need in the art for technology for more efficiently and stably implementing visible light communication with color lamps.

SUMMARY OF THE INVENTION

Accordingly, the present invention has been made to solve the above-mentioned problems occurring in the prior art, and the present invention provides a color lamp driving method for increasing the lifespan of a color lamp, and more stably performing high-speed visible light communication, and an apparatus therefor.

In accordance with the present invention, there is provided a color lamp driving apparatus for generating illumination light of various colors by using a plurality of R, G and B lamps together with each other, including a color controller for generating a color control signal, which indicates driving time rates of R, G, and B lamp arrays, according to color information of required illumination light, and a lamp driving module for outputting a driving signal for driving each of R, G, and B lamp arrays according to the color control signal output from the color controller, wherein the driving signal is set to apply driving times for the R, G, and B lamp arrays based on one among a start time point, a middle time point, and an end time point of each corresponding light-emitting period "ΔT" within one light-emitting period "T."

In accordance with the present invention, there is provided a color lamp driving method for generating illumination light of various colors by using a plurality of R, G and B lamps together with each other, including generating a color control signal, which indicates driving time rates of R, G, and B lamp arrays, according to color information of required illumination light, and setting a driving time of each of R, G, and B lamp arrays to be driven based on one among a start time point, a middle time point, and an end time point of each corresponding period "ΔT" within one light-emitting period "T," and driving the respective R, G, and B lamp arrays according to the generated color control signal.

According to the present invention, when the R, G and L LED arrays, which constitute the RGB LED lamp module, are driven in accordance with driving time rates determined according to a color to be expressed, each LED array is again subdivided into a plurality of subgroup LED arrays, and the respective subgroup LED arrays are controlled to be periodically powered on/off in mutually different time periods according to the driving time rates thereof. Accordingly, the heat generated from each LED array is fully emitted, so that the lifespan of LEDs are prolonged.

Also, the subgroup R, G and B LED arrays are powered on at a mutually different time point within one period so that the subgroup LED arrays cannot be powered off at the same time. In addition, data for visible light communication is modulated not onto all the subgroup R, G and B LED arrays, but onto only a subgroup LED array of one color in one period, so that high-speed visible light communication can be performed without interruption, and the intensities of received signals become uniform, which enables the quality to be enhanced. Also, driving voltages for driving the R, G and B LED arrays are generated through the use of sawtooth waves, each of which temporally continues, so that it is possible to smoothly change and express colors.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention. In addition, descriptions of well-known functions and constructions are omitted herein for the sake of clarity and conciseness.

Figure 1:
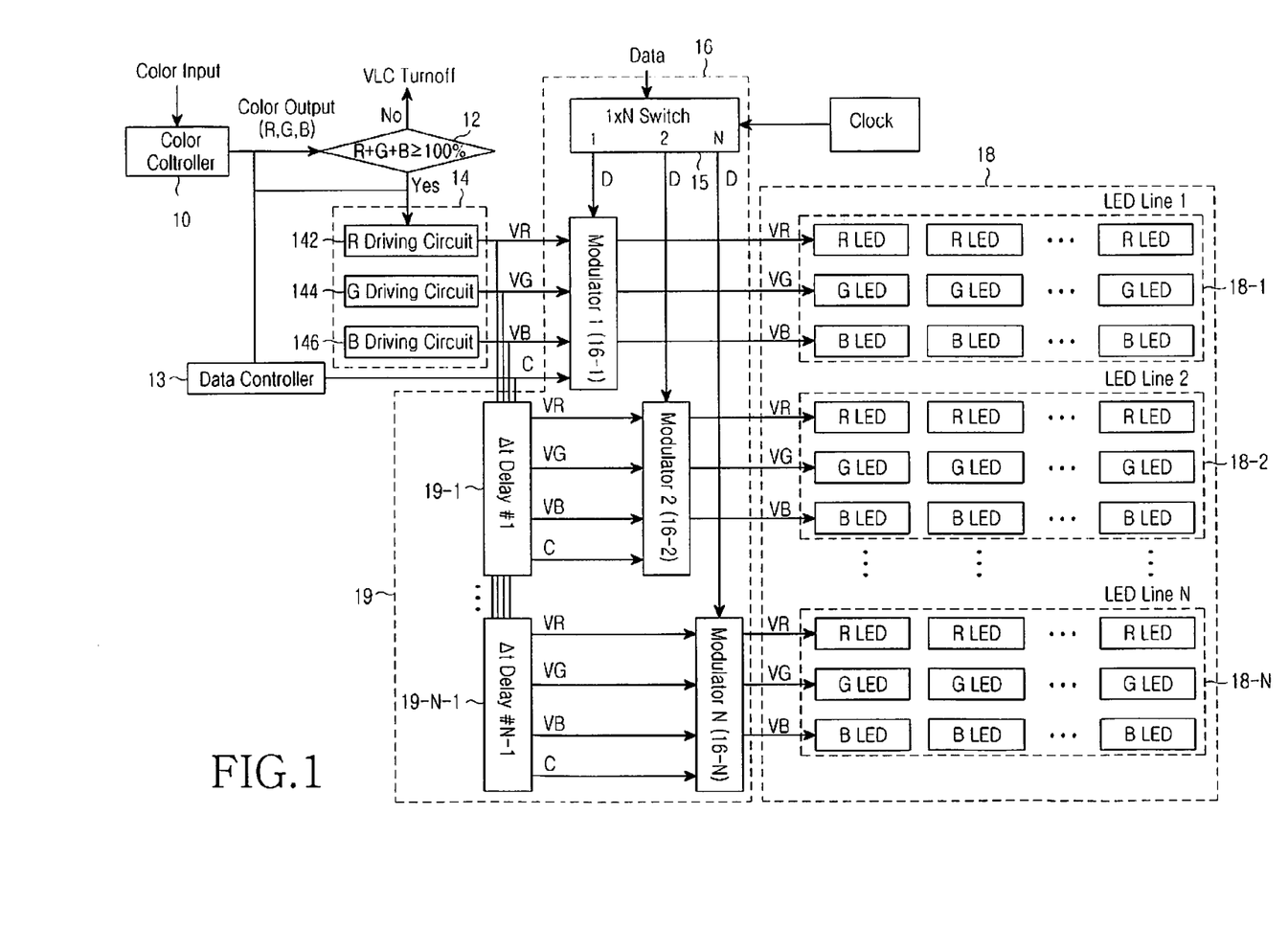
FIG. 1 illustrates the entire configuration of a color lamp driving apparatus for illumination and visible light communication according to an embodiment of the present invention.

FIG. 1 illustrates the entire configuration of a color lamp driving apparatus for illumination and visible light communication according to an embodiment of the present invention. Referring to FIG. 1, the apparatus is configured such that the apparatus generates illumination light with various colors, including white color, by using multiple LEDs of RGB colors together with each other, and performs visible light communication using such illumination light. The brightness level and color of illumination light can be selected according to the user's input through a properly-configured on/off status, brightness, and color control switch for the illumination light.

The input color information of illumination light, as described above, is input to a color controller 10. In order to generate illumination light of a corresponding color by mixing R, G and B colors according to the input color information, the color controller 10 determines the respective driving time rates of R, G and B LED arrays 18-1 to 18-N, which constitute a color lamp module 18, and then outputs a color control signal indicating the respective RGB driving time rates. For example, in order to generate white light during one light-emitting period "T," the driving time rates of the RGB LED arrays may be set to the same value, such as 100%, within a corresponding period "ΔT."

The color control signal output from the color controller 10, as described above, may be provided to the lamp-driving module 14 so as to directly drive the respective RGB LED arrays. However, according to the present invention, the color control signal is first provided to a communication condition determiner 12 so as to determine whether the rates correspond to a state in which visible light communication can be smoothly performed. The communication condition determiner 12 determines whether the sum of the RGB driving time rates in the color control signal output from the color controller 10 is at least 100%, thereby determining whether the rates correspond to a state in which the visible light communication can be smoothly performed.

When it is determined that the visible light communication cannot be smoothly performed, as a result of the determination, the communication condition determiner 12 may generate an alarm signal, such as a VLC Turnoff signal, representing that the visible light communication cannot be smoothly performed. Such an alarm signal is provided to a separate alarm device (not shown) provided on the outside so that various visible and/or audible alarm operations can be performed.

Meanwhile, the lamp driving module 14 outputs a driving signal for driving the respective RGB LED arrays according to the color control signal output from the color controller 10, wherein the driving signal is set to apply each driving time of the RGB LED arrays based on a start, a middle or an end time point of each corresponding light-emitting period "ΔT" within one light-emitting period "T." For example, when driving time rates of RGB LED arrays are 30%, 80%, and 40%, respectively, the R LED array is driven to emit light from the start point to the 3/10 point of its corresponding period "ΔT," the G LED array is driven to emit light from the 1/10 point to the 9/10 point of its corresponding period "ΔT," and the B LED array is driven to emit light from the 6/10 point to the end point of its corresponding period "ΔT."

The lamp driving module 14 includes an R driving circuit 142, a G driving circuit 144, and a B driving circuit 146, which generate driving signals to drive the R, G, and B LED arrays to emit light, respectively, during the respective driving time periods according to the R, G and B color driving time rate values output from the color controller 10.

The respective driving signals for the R, G, and B LED arrays, which are output from the lamp-driving module 14, are applied to a modulation module 16 that combines corresponding visible light communication data with at least a part of the driving signals for the R, G, and B LED arrays, and outputs the resultant signal to the color lamp module 18. By the driving signals for the R, G, and B LED arrays, which have been combined with the visible light communication data, the respective R, G, and B LED arrays of the color lamp module 18 emit light.

Accordingly, the present invention discloses a method for generating a desired color as a whole by driving the respective R, G, and B LED arrays to emit light based on mutually different points even within one light-emitting period "T." This enables the emitted visible light to be generated with a uniform intensity, almost without interruption, as a whole, so that it is possible to stably transmit visible light communication data.

Generally, a method for driving RGB LED arrays may be implemented in such a manner as to simply power on/off the respective corresponding R, G, and B LED arrays according to the driving time rates of the R, G, and B LED arrays based on color desired to be expressed, without considering specific driving points in each corresponding period. However, since the intensity of visible light emitted from lamps changes rapidly as time elapses, the intensity of a signal received in visible light communication changes, which degrades the signal quality. Also, a time section during which all LED arrays are simultaneously powered off may occur, and visible light communication of transmitting data through visible light is not performed during the time section, so that it is difficult to achieve high-speed visible light communication. The apparatus according to the present invention described above solves such a problem.

Meanwhile, when it is possible to continuously transmit data during one period "ΔT," without combining visible light communication data with the entire LED arrays of all colors, for example, the visible light communication data may be combined only through the LED array of a color corresponding to a driving time rate of 100%. Accordingly, the color lamp driving apparatus of the present invention further includes a data controller 13, which determines whether there is at least one color for which light is emitted without interruption during the entire corresponding light-emitting period "ΔT" according to the color control signal output from the color controller 10, and outputs a data modulation control signal "C" to modulate data for communication through the corresponding color.

Meanwhile, when the R, G and B LED arrays are periodically powered on/off in accordance with driving time rates predetermined according to colors to be expressed, much heat is generated according to the driving time rates, which reduces the lifespan of the LED. Accordingly, in the present invention, the color lamp module 18 is configured such that the entire RGB LED arrays of the color lamp module 18 are again classified into a plurality (N number) of subgroups of RGB LED arrays, and the respective subgroups of RGB LED arrays 18-1, 18-2, . . . , 18-N are sequentially driven to emit light within one light-emitting period "T." In this case, the time during which the respective subgroups of RGB LED arrays 18-1, 18-2, ..., 18-N are driven to emit light is expressed as $\Delta T$, $\Delta T \times N = T$.

To this end, the color lamp driving apparatus of the present invention further includes a sequential driving signal generation module 19, which generates signals delayed accumulatively in a unit of $\Delta T$ from the driving signals of the respective R, G, and B LED arrays which are output from the lamp driving module 14, and provides the delayed signals to the respective subgroups of RGB LED arrays 18-1, 18-2, ..., 18-N. The sequential driving signal generation module 19 may include a first delay unit 19-1 for generating signals first-delayed by $\Delta T$ from the driving signals of the respective R, G, and B LED arrays which are output from the lamp driving module 14, and multiple (N−1) delay units 19-2, ..., 19-N−1, which are connected in a cascade manner such that the signal first-delayed by the first delay unit 19-1 can be delayed accumulatively in a unit of $\Delta T$.

In this case, the modulation module 16 performs a modulation operation to combine visible light communication data according to the respective driving signals for the respective subgroups of RGB LED arrays 18-1, 18-2, ..., 18-N, wherein the driving signals are output from the lamp driving module 14 and the sequential driving signal generation module 19. To this end, the modulation module 16 may include a plurality (N number) of sub-modulators 16-1, 16-2, ..., 16-N provided according to the driving signals for the respective subgroups of RGB LED arrays 18-1, 18-2, ..., 18-N. Also, the color lamp driving apparatus may include a 1×N switch 15 for performing a switching operation to sequentially provide visible light communication data to corresponding sub-modulators 16-1, 16-2, ..., 16-N. The 1×N switch 15 may receive a clock signal with a period of $\Delta T$ as a switching control signal, and perform the switching operation.

Hereinafter, the operation of the color lamp driving apparatus according to an embodiment of the present invention will be described in more detail. As to the driving principle of the color lamp module, the RGB LED lamp module includes N number of subgroups of RGB LED arrays 18-1, ..., 18-N, and each subgroup includes an R LED array, a G LED array, and a B LED array, which are a smaller scale than the subgroup. The subgroups of RGB LED arrays 18-1, ..., 18-N are cyclically powered on according to a period of $\Delta t$.

That is, after the first subgroup's RGB LED array 18-1 is powered on during a period of a first $\Delta t$ and is then powered off, the second subgroup's RGB LED array 18-2 is powered on during a period of a second $\Delta t$ and is then powered off. During a period of a $N^{th}$ $\Delta t$ in regular sequence, the $n^{th}$ subgroup's RGB LED array 18-N is powered on, and is then powered off when the period of the $N^{th}$ $\Delta t$ has elapsed, so that the respective subgroups of RGB LED arrays 18-1, ..., 18-N are once powered on, and are then power off in regular sequence during N $\Delta t$s.

The powering on/off of the subgroups' RGB LED arrays are repeated in such a manner that the first subgroup's RGB LED array 18-1 is powered on during a period of a $(N+1)^{th}$ $\Delta t$ and is then powered off, so that the entire subgroups of RGB LED arrays 18-1, ..., 18-N are driven in a cycle of $T = N \times \Delta t$. Generally, as used in TV broadcasting, when color images are driven 30 times per second, the human eye recognizes the color images as smooth images without interruption. Therefore, it is expected that, when the overall LEDs configured as N number of subgroups of RGB LED arrays 18-1, ..., 18-N are driven 30 times or more per second, there is no problem in driving the lamp module.

Images are generally driven 120 times per second in a Liquid Crystal Display (LCD) monitor in order to reduce eyestrain of the user and to smoothly implement the images. Therefore, according to an embodiment of the present invention, the LED lamp module is configured such that N number of subgroups of RGB LED arrays 18-1, ..., 18-N are driven 120 times or more per second. For example, when N number of subgroups of RGB LED arrays 18-1, ..., 18-N are driven 120 times per second, $T=1/120$, so that $\Delta t = T/N = 1/(120 \times N)$.

Color information is input to the color controller 10 when the user selects a desired illumination color. The color controller 10 finds values of driving (or light-emitting) time rates (%) in accordance with the input color information from a preset table (not shown), and outputs [R, G, B] values as color control information. The [R, G, B] values are expressed as percentage values of time rates, during which R, G and B arrays within each subgroup's RGB LED array 18-1, ..., 18-N are driven within a time period of $\Delta T$, respectively.

For example, when the [R, G, B] values are [50, 30, 100], the ON time period of the R LED array is $\Delta t \times 50\%$ ($\Delta tr$), the ON time period of the G LED array is $\Delta t \times 30\%$ ($\Delta tg$), and the ON time period of the B LED array is $\Delta t \times 100\%$ ($\Delta tb$) within the first subgroup's RGB LED array 18-1 in order to express color. In the next $\Delta t$ time period, the R, G and B arrays in the second subgroup's RGB LED array 18-2 are driven in the same manner as those in the first subgroup's RGB LED array 18-1. The subgroups of the other RGB LED arrays are sequentially driven in the same manner.

When the [R, G, B] values output from the color controller 10 are input to the communication condition determiner 12, the communication condition determiner 12 determines whether a sum of the [R, G, B] values is equal to or greater than 100%, informs that the visible light communication function is in an unsmooth state by raising an alarm when the sum is less than 100%, and determines that the visible light communication function is in a smooth state when the sum is equal to or greater than 100%. If the sum of the [R, G, B] values is less than 100%, it is very difficult to secure the intensity of visible light enough to perform visible light communication, and a time at which the R, G and B arrays are simultaneously powered off within the $\Delta t$ time period occurs, so that the visible light communication may be interrupted.

The [R, G, B] values passing through the communication condition determiner 12, as described above, are input to the R driving circuit 142, the G driving circuit 144, and the B driving circuit 146, respectively, in the lamp driving module 14, so that the R, G and B driving circuits 142, 144, and 146 output driving voltages VR, VG, and VB for driving the R, G and B arrays, respectively.

Figure 2A:
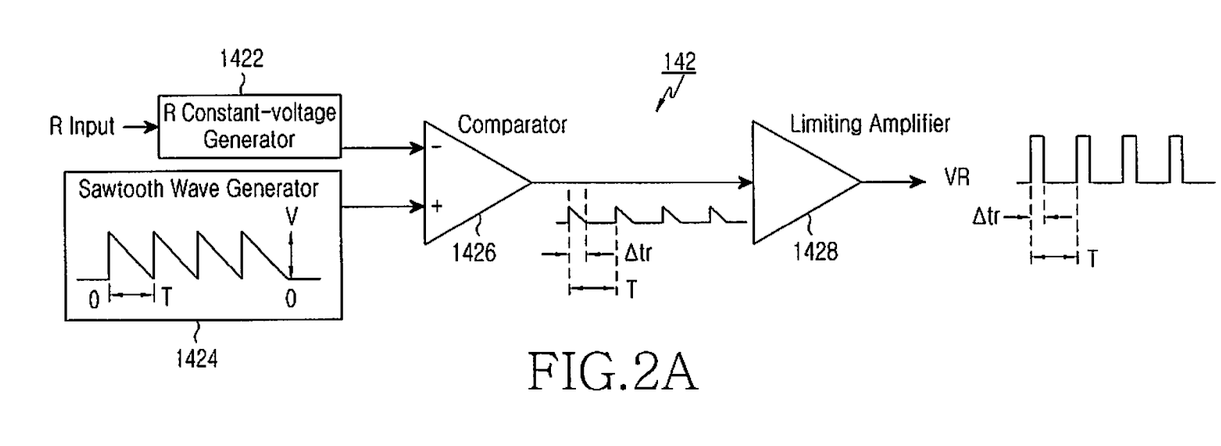
FIGS. 2A and 2B illustrate a detailed configuration of an R driving circuit of a lamp driving module shown in FIG. 1.
Figure 2B:
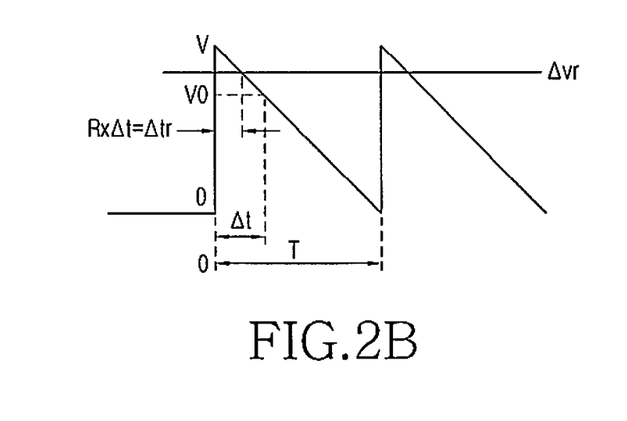

FIG. 2A illustrates a detailed configuration of the R driving circuit 142, and FIG. 2B illustrates an example of a main waveform of the R driving circuit 142. Referring to FIGS. 2A and 2B, the R driving circuit 142 includes a sawtooth wave generator 1424 for generating a sawtooth wave which repeatedly changes the voltage value thereof from voltage V to zero during period T, a constant-voltage generator 1422 for receiving the R value among the [R, G, B] values, and outputting constant voltage $\Delta vr$ corresponding to voltage-based power-on time of $\Delta t \times R = \Delta tr$ of the sawtooth wave in order to generate driving voltage VR which allows the R LED array of the subgroups of RGB LED arrays 18-1, ..., 18-N to be powered on by the R value within the $\Delta t$ time period and then to be powered off; a comparator 1426 for receiving the signals output from the sawtooth wave generator 1424 and constant-voltage generator 1422 through "+" and "−" input terminals of the comparator, respectively, and outputting only voltages, which are greater than an input constant voltage $\Delta vr$, among the input sawtooth wave, and a limiting amplifier 1428 for receiving the output of the comparator 1426, performing waveform shaping, and outputting driving voltage VR in which a pulse having a width of Δtr is repeated in period T. The voltage of the sawtooth generated by the sawtooth wave generator 1424 has voltage V0 when time period Δt has elapsed in the course of changing from initial voltage V to zero, and the Δvr has a proper voltage value between voltage V0 and voltage V.

Figure 3A:
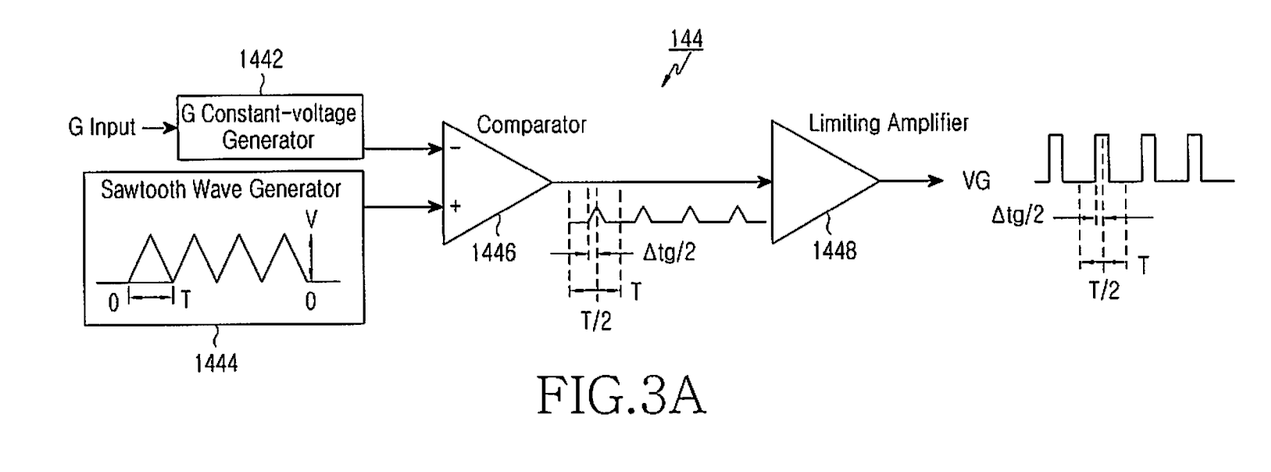
FIGS. 3A and 3B illustrate a detailed configuration of a G driving circuit of a lamp driving module shown in FIG. 1.
Figure 3B:
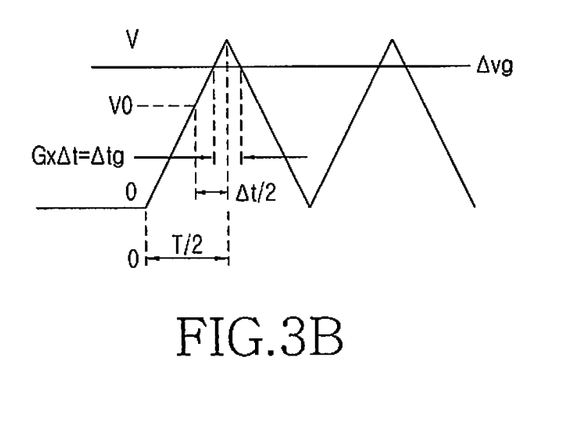

FIG. 3A illustrates a detailed configuration of the G driving circuit 144, and FIG. 3B illustrates an example of a main waveform of the G driving circuit 144. Referring to FIGS. 3A and 3B, the G driving circuit 144 is configured similarly to the R driving circuit 142, except that the G driving circuit 144 processes the G value. In addition, there is a significant difference in that a sawtooth wave generator 1444 in the G driving circuit 144 generates a sawtooth wave in the shape of an isosceles triangle, which has voltage values periodically changing from zero to voltage V and then again to zero in period T. In this case, the sawtooth wave has the maximum voltage at time T/2 within period T.

In addition, a G constant-voltage generator 1442 outputs constant voltage Δvg corresponding to power-on time of Δt×G=Δtg in order to generate driving voltage VG which allows the G LED array to be powered on by the G value within the Δt time period and then to be powered off. A comparator 1446 in the G driving circuit 144 outputs only those voltages that are larger than input constant voltage Δvg from among an input sawtooth wave. The voltages output from the comparator 1446 are input to a limiting amplifier 1448, and the limiting amplifier 1448 outputs driving voltage VG in which a pulse having a width of Δtg is repeated in period T. The pulse having the width of Δtg is positioned with time T/2 as the center thereof within the T time period.

Figure 4A:
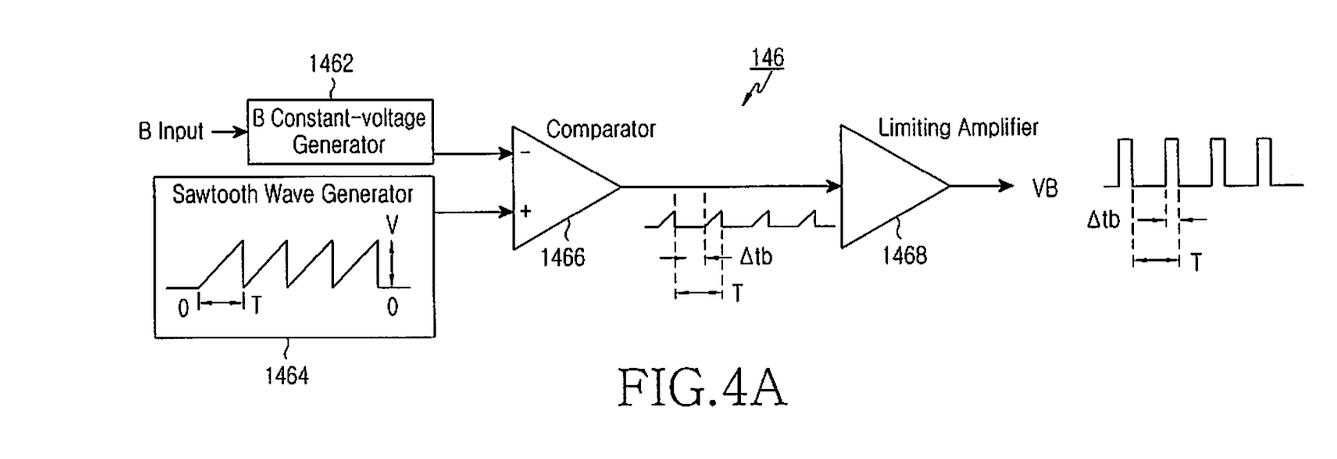
FIGS. 4A and 4B illustrate a detailed configuration of a B driving circuit of a lamp driving module shown in FIG. 1.
Figure 4B:
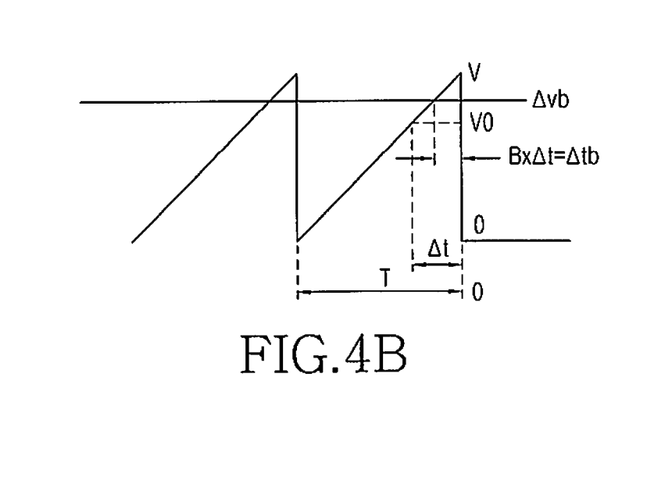

FIG. 4A illustrates the B driving circuit 146, and FIG. 4B illustrates an example of a main waveform of the B driving circuit 146. Referring to FIGS. 4A and 4B, the B driving circuit 146 is configured similarly to the R driving circuit 142 and G driving circuit 144, except that the B driving circuit 146 processes the B value. In addition, there is a difference in that a sawtooth wave generator 1464 in the B driving circuit 146 generates a sawtooth wave having voltage values that periodically change from zero to voltage V in period T. That is, the sawtooth wave generator 1464 generates a sawtooth wave having an opposite shape to that of the sawtooth wave generated by the R driving circuit 146.

In addition, a B constant-voltage generator 1462 outputs constant voltage Δvb corresponding to power-on time of Δt×B=Δtb in order to generate driving voltage VB which allows the B LED array to be powered on by the B value within the Δt time period and then to be powered off. A comparator 1466 in the B driving circuit 146 outputs only voltages greater than input constant voltage Δvb from among an input sawtooth wave. The voltages output from the comparator 1446 is input to a limiting amplifier 1468, which outputs driving voltage VB in which a pulse having a width of Δtb is repeated in period T. The pulse having the width of Δtb is positioned based on time T within the T time period.

Since the human eye perceives colors as an average with respect to a speed higher than a certain speed, colors output by LED arrays driven based on mutually different times within a Δt time period are averaged in the Δt time period and are perceived by the human eye. Accordingly, although the respective LED arrays are driven based on mutually different times in the Δt time period, the same color is generated as that expressed when the LED arrays are driven based on the same time.

Meanwhile, the [R, G, B] values are input to the data controller 13, which outputs a data modulation control signal "C" to control the modulation module 16. The data controller 13 outputs control signal "cr," "cg," and "cb" to control which driving signal of driving signals VR, VG and VB data is to be modulated onto, which are for driving the R, G and B LED arrays of the respective subgroups of RGB LED arrays 18-1, ..., 18-N in regular sequence within the Δt time period based on the [R, G, B] values.

Figure 5:
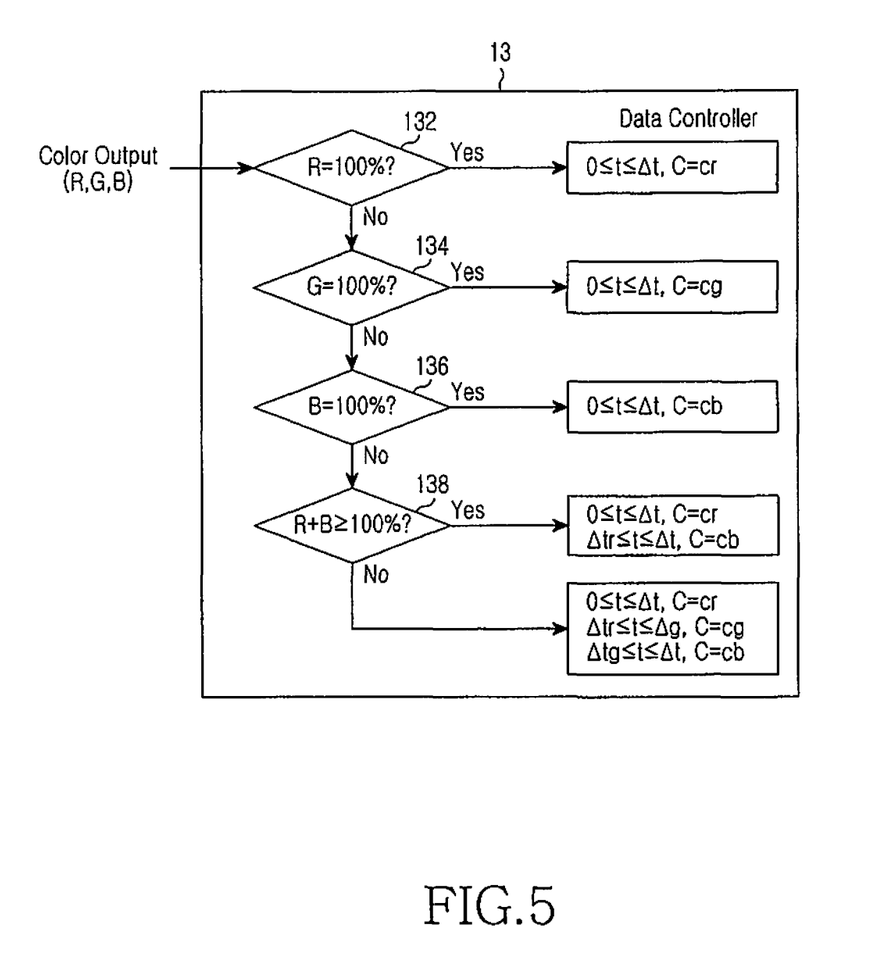
FIG. 5 illustrates the operation of a data controller shown in FIG. 1.

In FIG. 5, steps 132, 134, and 136 are performed to sequentially find a color having a value of 100% from among [R, G, B]. When there is a value of 100%, control signal "cr," "cg," or "cb" to indicate a driving voltage for receiving and outputting the value of 100% is output. For example, control signal C is determined to be "cr" when the R value is 100%, control signal C is determined to be "cg" when the G value is 100%, and control signal C is determined to be "cb" when the B value is 100%.

When it is determined that there is no value of 100%, it is determined whether a sum of the R value and the B is 100% or greater. When the sum of the R value and the B value is 100% or greater, control signal C is determined to be "cr" and "cb" in regular sequence. In contrast, when the sum of the R value and the B value is less than 100%, control signal C is determined to be "cr," "cg," and "cb" in regular sequence. Sequential output times of control signals "cr," "cg," and "cb" are determined based on the end times of Δtr and Δtg within Δt.

Data modulation control signal C output from the data controller 13, and voltages VR, VG, and VB output through the sequential driving signal generation module from the lamp driving module 14 are input to the respective sub-modulators 16-1, 16-2, ..., 16-N included in the modulation module 16.

Figure 6:
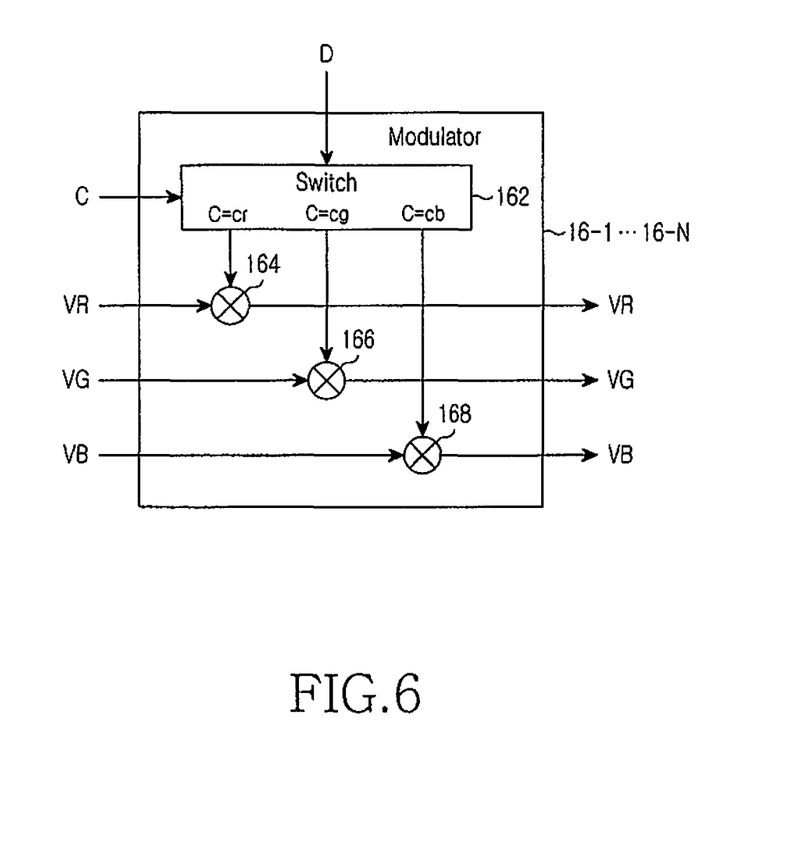
FIG. 6 illustrates the detailed configuration of each sub-modulator in a modulation module.

FIG. 6 illustrates the detailed configuration of each sub-modulator 16-1, 16-2, ..., 16-N. Referring to FIG. 6, visible light communication data input to the respective sub-modulators 16-1, 16-2, ..., 16-N is modulated in a driving voltage of a color selected by data modulation control signal C, and is then output, while unselected driving voltages are output without change. For example, voltage VR is modulated at modulator element 164 according to data when C=cr, voltage VG is modulated at modulator element 166 according to data when C=cg, and voltage VB is modulated at modulator element 168 according to data when C=cb. Voltages VR, VG, and VB output from the respective sub-modulators 16-1, 16-2, ..., 16-N drive the R, G and B LED arrays in a corresponding subgroup's RGB LED array.

More specifically, each of signals C, VR, VG, and VB is first branched into two signals, and each one of the firstly branched signals is input to the first sub-modulator 16-1 without time delay. Then, the first sub-modulator 16-1 outputs voltages VR, VQ and VB, which allow the R, G and B LED arrays of the first subgroup's RGB LED array 18-1 to be driven. Each of the other signals of the firstly branched signals is delayed by time Δt through the first delay unit 19-1, and is secondly branched into two signals. Each one of the secondly branched signals is input to the second sub-modulator 16-2, which outputs voltages VR, VG, and VB. This allows the R, G and B LED arrays of the second subgroup's RGB LED array 18-2 to be driven.

Each of the other signals of the secondly branched signals is delayed by time Δt through the second delay unit 19-2, and is thirdly branched into two signals. Each one of the thirdly branched signals is input to the third sub-modulator 16-3, which outputs voltages VR, VG, and VB. This allows the R, G and B LED arrays of the third subgroup's RGB LED array 18-3 to be driven. In this manner, all of the subgroups of the RGB LED arrays 18-1, 18-2, ..., 18-N are respectively and sequentially driven in an interval of time Δt, so that every subgroup's RGB LED array is driven once during time T, which operation is repeated in period T.

Data for visible light communication is transmitted to a first sub-modulator 16-1 to a $N^{th}$ sub-modulator 16-N in regular sequence by the 1×N switch 162, which performs a switching operation from #1 to #N in regular sequence by means of a clock with a driving frequency of 1/Δt. When the switch 162 has performed the switching operation until #N, the switch 162 again performs a switching operation of #1 by a following clock, thereby repeating the aforementioned switching operation.

When signals C, VR, VG, and VB are input to the first sub-modulator 16-1, data also is input to the first sub-modulator 16-1 through the 1×N switch 162. Also, when signals C, VR, VG, and VB are input to the second sub-modulator 16-2 after being delayed by time Δt through the first delay unit 19-1, data also is transmitted the second sub-modulator 16-2 through the 1×N switch 162, which has been switched by a clock having a frequency of 1/Δt. Such an operation is repeated so that data for visible light communication is transmitted to each sub-modulator in synchronization with signals C, VR, VG, and VB.

Figure 7:
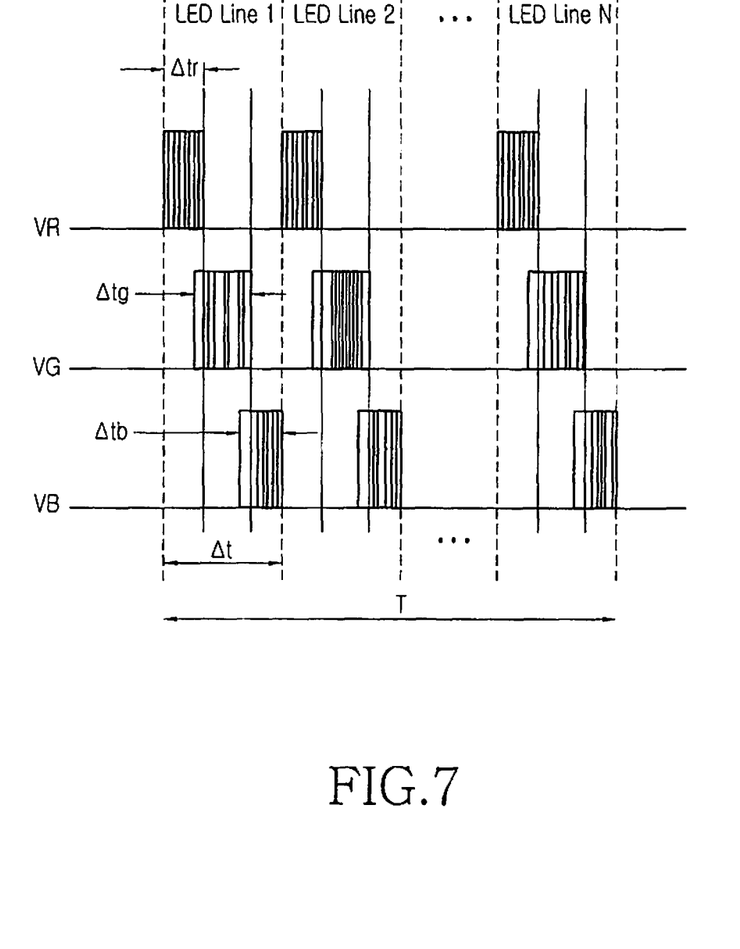
FIG. 7 illustrates the waveforms of driving signals provided to a color lamp module, shown in FIG. 1.

FIG. 7 illustrates an example in which driving voltages VR, VG, and VB for driving the R, G and B LED arrays of each subgroup's RGB LED array 18-1, 18-2, ..., 18-N are modulated according to data. As shown in FIG. 7, according to driving-time rates of the R, G and B LED arrays to express a color selected by the user, each subgroup's RGB LED array is driven, and simultaneously, data for visible light communication is ceaselessly modulated and transmitted. In addition, each subgroup's RGB LED array 18-1, 18-2, ..., 18-N is driven only during time Δt within time period T, and is not driven during the remaining time, which is enough to fully emit heat generated upon driving of each RGB LED array, so that the lifespan of each LED is prolonged. Also, driving voltages VR, VG, and VB for driving the R, G and B LED arrays are generated by a sequential sawtooth wave, so that it is possible to smoothly change and express colors.

Although embodiments of the present invention has been described for illustrative purposes, those skilled in the art will appreciate that various modifications, additions and substitutions are possible, without departing from the scope and spirit of the invention as disclosed in the accompanying claims. For example, although the above description is based on generating driving signals by means of sawtooth waves having appropriate shapes in the sequence of R, G, and B, and modulating data, it is possible to replace the sequence of R, G, and B with the sequence of G, B, and R, or the like. Also, although the above description is given based on driving signals of mutually different colors being appropriately selected according to control signal C provided by the data controller in order to modulate visible communication data, the present invention can be implemented in such a manner as to modulate visible communication data simply onto driving signals of all colors.

As described above, various modifications, additions and substitutions are possible in the present invention. Accordingly, the scope of the invention is not to be limited by the above embodiments but by the claims and the equivalents thereof.

What is claimed is:

1. A color lamp driving apparatus for generating illumination light of various colors by using a plurality of Red (R), Green (R), and Blue (B) lamps together with each other, the color lamp driving apparatus comprising:

a color controller for generating a color control signal, which indicates driving time rates of R, G, and B lamp arrays, according to color information of required illumination light;

a lamp driving module for outputting a driving signal for driving each of the R, G, and B lamp arrays according to the color control signal output from the color controller, wherein the driving signal is set to apply driving times for the R, G, and B lamp arrays based on one of a start time point, a middle time point, and an end time point of each corresponding light-emitting period ΔT and B lamp arrays are classified into a plurality of subgroups of R, G, and B lamp arrays, which are configured to sequentially emit light according to each corresponding light-emitting period ΔT within one entire light-emitting period T;

a sequential driving signal generation module for generating signals delayed accumulatively in a unit of ΔT from driving signals of the respective R, G, and B lamp arrays, which are output from the lamp driving module, and providing the delayed signals to a respective one of the subgroups of R, G, and B lamp arrays; and a modulation module comprising:

a plurality of sub-modulators provided according to driving signals for a respective one of the subgroups of the R, G, and B lamp arrays; and a switch for performing a switching operation to sequentially provide visible light communication data to a corresponding one of the plurality of sub-modulators, so as to perform a modulation operation for combining, through the plurality of sub-modulators, visible light communication data with the driving signals for a respective one of the subgroups of the R, G, and B lamp arrays, according to the driving signals output from the lamp driving module and the sequential driving signal generation module.

2. The apparatus as claimed in claim 1, further comprising a communication condition determiner for generating an alarm signal for informing that smooth visible light communication is not possible when a sum of driving time rates for R, G, B lamp arrays in a color control signal output from the color controller does not total a preset reference value.

3. The apparatus as claimed in claim 1, further comprising a data controller, which determines whether at least one color has light that is emitted without interruption in a corresponding light-emitting period ΔT according to the color control signal output from the color controller, and outputs a data modulation control signal to modulate visible light communication data through the corresponding color, wherein the modulation module modulates visible light communication data onto a driving signal of a corresponding color according to the data modulation control signal output from the data controller.

4. The apparatus as claimed in claim 1, wherein color control information of the color controller comprises R, G, and B values, which represent driving time rates of R, G, and B lamp arrays included in a respective one of the subgroups of the RGB lamp arrays within a Δt time period, and the lamp driving module comprises R, G, and B driving circuits for generating driving signals for the R, G, and B lamp arrays, respectively, wherein each of the R, G, and B driving circuits comprises:

a sawtooth wave generator for generating one of a sawtooth wave changing from voltage V to zero, an isosceles-triangle-shaped sawtooth wave changing from zero to voltage V and back to zero, and a sawtooth wave changing from zero to voltage V in a period T;

a constant-voltage generator for receiving a corresponding value from among the R, G, and B values, and outputting constant voltage $\Delta vr$ corresponding to voltage-based power-on time of $\Delta t \times R = \Delta tr$, constant voltage $\Delta vg$ corresponding to voltage-based power-on time of $\Delta t \times G = \Delta tg$, or constant voltage $\Delta vb$ corresponding to voltage-based power-on time of $\Delta t \times B = \Delta tb$ with respect to a corresponding sawtooth wave in order to generate a driving voltage which allows the R, G, and B lamp arrays corresponding to the subgroups of R, G, and B lamp arrays to be powered on by a corresponding R, G, or B value and then to be powered off within the $\Delta t$ time period;

a comparator for receiving a signal output from a corresponding sawtooth wave generator and a corresponding constant-voltage generator, and outputting only voltages, which are greater than an input constant voltage $\Delta vr$, $\Delta vg$, or $\Delta vb$ in a received sawtooth wave; and a limiting amplifier for receiving the output of the comparator, performing waveform shaping, and outputting the waveform-shaped signal.

\* \* \* \* \*